(12) United States Patent
Ng et al.

(10) Patent No.: US 11,694,066 B2
(45) Date of Patent: Jul. 4, 2023

(54) MACHINE LEARNING RUNTIME LIBRARY FOR NEURAL NETWORK ACCELERATION

(71) Applicant: Xilinx, Inc., San Jose, CA (US)

(72) Inventors: Aaron Ng, San Jose, CA (US); Jindrich Zejda, Saratoga, CA (US); Elliott Delaye, San Jose, CA (US); Xiao Teng, Cupertino, CA (US); Sonal Santan, San Jose, CA (US); Soren T. Soe, San Jose, CA (US); Ashish Sirasao, San Jose, CA (US); Ehsan Ghasemi, San Jose, CA (US); Sean Settle, San Jose, CA (US)

(73) Assignee: XILINX, INC., San Jose, CA (US)

( * ) Notice: Subject to any disclaimer, the term of this patent is extended or adjusted under 35 U.S.C. 154(b) by 1124 days.

(21) Appl. No.: 15/785,679

(22) Filed: Oct. 17, 2017

(65) Prior Publication Data

US 2019/0114533 A1     Apr. 18, 2019

(51) Int. Cl.
   *G06N 3/063*    (2006.01)
   *G06N 3/10*    (2006.01)
   (Continued)

(52) U.S. Cl.
   CPC ............... *G06N 3/063* (2013.01); *G06N 3/04* (2013.01); *G06N 3/08* (2013.01); *G06N 3/10* (2013.01); *G06N 3/045* (2023.01); *G06V 10/955* (2022.01)

(58) Field of Classification Search
   CPC ............ G06N 3/063; G06N 3/04; G06N 3/08; G06N 3/10; G06K 9/00986
   See application file for complete search history.

(56) References Cited

U.S. PATENT DOCUMENTS

| 6,346,825 B1 | 2/2002 | Pang et al. |
| 9,710,265 B1 | 7/2017 | Temam et al. |

(Continued)

FOREIGN PATENT DOCUMENTS

| CN | 1627251 A | 6/2005 |
| CN | 106503791 A | 3/2017 |

(Continued)

OTHER PUBLICATIONS

Zhang, Chen, et al. "Energy-efficient CNN implementation on a deeply pipelined FPGA cluster." Proceedings of the 2016 International Symposium on Low Power Electronics and Design. 2016. (Year: 2016).*

(Continued)

*Primary Examiner* — Kevin W Figueroa
(74) *Attorney, Agent, or Firm* — Patterson + Sheridan, LLP

(57) ABSTRACT

Embodiments herein describe techniques for interfacing a neural network application with a neural network accelerator using a library. The neural network application may execute on a host computing system while the neural network accelerator executes on a massively parallel hardware system, e.g., a FPGA. The library operates a pipeline for submitting the tasks received from the neural network application to the neural network accelerator. In one embodiment, the pipeline includes a pre-processing stage, an FPGA execution stage, and a post-processing stage which each correspond to different threads. When receiving a task from the neural network application, the library generates a packet that includes the information required for the different stages in the pipeline to perform the tasks. Because the stages correspond to different threads, the library can process multiple packets in parallel which can increase the utiliza- (Continued)

FIG. 2 tion of the neural network accelerator on the hardware system.

20 Claims, 12 Drawing Sheets

(51) Int. Cl.
    *G06N 3/08*     (2006.01)
    *G06N 3/04*     (2006.01)
    *G06V 10/94*     (2022.01)
    *G06N 3/045*     (2023.01)

(56) References Cited

U.S. PATENT DOCUMENTS

| | | | | |
|---|---|---|---|---|
| 2010/0076915 | A1* | 3/2010 | Xu | G06N 3/084 706/25 |
| 2015/0066826 | A1* | 3/2015 | Canoy | G06N 3/10 706/25 |
| 2015/0199963 | A1 | 7/2015 | Maaninen | |
| 2015/0268978 | A1 | 9/2015 | Vu et al. | |

FOREIGN PATENT DOCUMENTS

| | | | |
|---|---|---|---|
| CN | 107239829 | | 10/2017 |
| JP | 2005182785 | A | 7/2005 |
| JP | 2009116872 | A | 5/2009 |
| JP | 2014527733 | A | 10/2014 |
| JP | 2017050001 | A | 3/2017 |
| KR | 20170109600 | A | 9/2017 |
| WO | 2016077393 | | 5/2016 |
| WO | 2017091763 | A1 | 6/2017 |

OTHER PUBLICATIONS

Koyuncu, ismail, et al. "A neuron library for rapid realization of artificial neural networks on FPGA: A case study of Rössler chaotic system." Journal of Circuits, Systems and Computers 26.01 (2017): 1750015. (Year: 2017).*
Akesson, Benny, "An introduction to SDRAM and memory controllers," downloaded Sep. 25, 2017 from http://www.es.ele.tue.nl/premadona/files/akesson01.pdf, pp. 1-30, Eindhoven University of Technology, Eindhoven, The Netherlands.
Chetlur, Sharan et al., "cuDNN: Efficient Primitives for Deep Learning," submitted Oct. 3, 2014, pp. 1-9, https://arxiv.org/pdf/1410.0759.pdf, Cornell University Library.
Di Carlo, Stefano et al., "An Area-Efficient 2-D Convolution Implementation on FPGA for Space Applications," Proc. of the 2011 IEEE 6th International Design & Test Workshop, Dec. 11, 2011, pp. 88-92, IEEE, Piscataway, New Jersey, USA.
Gysel, Philipp, "Ristretto: Hardware-Oriented Approximation of Convolutional Neural Networks," May 20, 2016, pp. 1-73, https://arxiv.org/abs/1605.06402, Cornell University Library.
Khronos, "clSetKernelArg," downloaded Sep. 22, 2017 from https://www.khronos.org/registry/OpenCL/sdk/1.0/docs/man/xhtml/clSetKernelArg.html, copyright 2007, pp. 1-4, Khronos Group, Beaverton, Oregon, USA.
Rizhevsky, Alex et al., "ImageNet Classification with Deep Convolutional Neural Networks," Proc. of the 12th International Conference on Neural Processing Systems, Dec. 3, 2012, pp. 1097-1105, ACM Digital Library, www.acm.org.
Mathworks, "im2col," dowloaded Sep. 22, 2017 from https://www.mathworks.com/help/images/ref/im2col.html?searchHighlight=im2col&s_tid=doc_srchtitle, pp. 1-3.
Saxena, Abhineet, "Convolutional Neural Networks (CNNs): An Illustrated Explanation," Jun. 20, 2016, downloaded Sep. 25, 2017 from http://xrds.acm.org/blog/2016/06/convolutional-neural-networks-cnns-illustrated-explanation/, pp. 1-15.

Shaaban, Muhammed, "Systolic Architectures," Mar. 11, 2003, Kate Gleason College of Engineering, Rochester Institute of Technology, Rochester, New York, USA.
Stanford, "CS231n Convolutional Neural Networks for Visual Recognition," downloaded Sep. 25, 2017 from http://cs231n.stanford.edu/, pp. 1-23, Stanford University, Stanford, California, USA.
Warden, Pete, "Why GEMM is at the heart of deep learning," Apr. 20, 2015, pp. 1-9, downloaded from https://petewarden.com/2015/04/20/why-gemm-is-at-the-heart-of-deep-learning/.
Wikipedia, "Convolutional neural network," Sep. 20, 2017, pp. 1-13, downloaded from https://en.wikipedia.org/wiki/Convolutional_neural_network.
Wikipedia, "Deep learning," Sep. 24, 2017, pp. 1-13, downloaded from https://en.wikipedia.org/wiki/Deep_learning.
Wikpedia, "Matrix Multiplication," Sep. 20, 2017, pp. 1-19, downloaded from https://en.wikipedia.org/wiki/Matrix_multiplication.
Wikipedia, "Multiprocessing," May 10, 2017, pp. 1-4, dowloaded from https://en.wikipedia.org/wiki/Multiprocessing.
Wikipedia, "Producer-consumer problem," Sep. 7, 2017, pp. 1-9, downloaded from https://en.wikipedia.org/wiki/Producer%E2%80%93consumer_problem.
Wikipedia, "Row- and colum-major order," Aug. 23, 2017, pp. 1-5, downloaded from https://en.wikipedia.org/wiki/Row-_and_column-major_order.
Wikipedia, "Systolic array," Mar. 22, 2017, pp. 1-5, downloaded from https://en.wikipedia.org/wiki/Systolic_array.
Wikipedia, "Very long instruction word," Jul. 13, 2017, pp. 1-3, downloaded from https://en.wikipedia.org/wiki/Very_long_instruction_word.
Xilinx, "Smarter Data Center," downloaded Sep. 22, 2017 from https://www.xilinx.com/applications/data-center.html, pp. 1-4, Xilinx, Inc., San Jose, California, USA.
Xilinx, "SDSoC Development Environment," downloaded Sep. 22, 2017 from https://www.xilinx.com/products/design-tools/software-zone/sdsoc.html, pp. 1-16, Xilinx, Inc., San Jose, California, USA.
Xilinx, "UltraScale Architecture DSP Slice User Guide," UG579 (v1.3), Nov. 24, 2015, pp. 1-74, Xilinx, Inc., San Jose, California, USA.
Xilinx, "Vivado High-Level Synthesis," downloaded Sep. 22, 2017 from https://www.xilinx.com/products/design-tools/vivado/integration/esl-design.html, pp. 1-2, Xilinx, Inc., San Jose, California, USA.
Xilinx, "Deep Learning with INT8 Optimization on Xilinx Devices," WP486 (v1.0.1), Apr. 24, 2017, pp. 1-11, Xilinx, Inc., San Jose, California, USA.
Xilinx, "Implementing Memory Structures for Video Processing in the Vivado HLS Tool," XAPP793 (v1.0), Sep. 20, 2012, pp. 1-8, Xilinx, Inc., San Jose, California, USA.
Xilinx, "Two-Dimensional Linear Filtering," XAPP933 (v1.1), Oct. 23, 2007, pp. 1-8, Xilinx, Inc., San Jose, California, USA.
Alwani, Manoj et al., "Fused-Layer CNN Accelerators," 2016 49th Annual International Symposium on Microarchitecture, Oct. 15, 2016 pp. 1-12, IEEE, Piscataway, New Jersey, USA.
Gokhale, Vinayak et al., "A 240 G-ops/s Mobile Coprocessor for Deep Neural Networks," Proc. of the IEEE Conference on Computer Vision and Pattern Recognition, Jun. 1, 2014, pp. 682-687, IEEE, Piscataway, New Jersey, USA.
Chakradhar, Srimat et al., "A Dynamically Configurable Coprocessor for Convolutional Neural Networks," Proc. of the 2015 ACM/SIGDA International Symposium on Field-Programmable Gate Arrays, Feb. 22, 2015, pp. 161-170, IEEE, Piscataway, New Jersey, USA.
Qiu, Jiantao et al., "Going Deeper with Embedded FPGA Platform for Convolutional Neural Network," Proc. of the 2016 ACM/SIGDA International Symposium on Field-Programmable Gate Arrays,Jan. 1, 2016, pp. 26-35, IEEE, Piscataway, New Jersey, USA.
Zhang, Chen et al., "Caffeine: Towards Uniformed Representation and Acceleration for Deep Convolutional Neural Networks," Proc. of the 2016 IEEE/ACM International Conference on Computer-Aided Design, Nov. 7, 2016, pp. 1-8, IEEE, Piscataway, New Jersey, USA.
Zhang, Chen et al., "Optimizing FPGA-based Acclerator Design for Deep Convolutional Neural Networks," Proc. of the 2016 ACM/

(56) References Cited

OTHER PUBLICATIONS

SIGDA International Symposium on Field-Programmable Gate Arrays, Feb. 22, 2015, pp. 161-170, IEEE, Piscataway, New Jersey, USA.
Zhao, Y., et al., "PIE: A Pipeline Energy-Efficient Accelerator for Inference Process in Deep Neural Networks," 2016 IEEE 22nd International Conference on Parallel and Distributed Systems (ICPADS), 2016, pp. 1067-1074.
Office Action from JP 2020-521369 dated Apr. 18, 2023.
M. Bettoni, et al.," A Convolutional Neural Network Fully Implemented on FPGA for Embedded Platforms"? (Sep. 28, 2017).
V.A. Gokhale, "Nn-X—a hardware accelerator for convolutional neural networks" (Aug. 2018).
Office Action from Chinese Patent Application No. 201880067685.8 dated Feb. 24, 2023.

\* cited by examiner

MACHINE LEARNING RUNTIME LIBRARY FOR NEURAL NETWORK ACCELERATION

TECHNICAL FIELD

Examples of the present disclosure generally relate to communication between a neural network application executing on a host computing system and a neural network accelerator.

BACKGROUND

Machine learning is the science of inducing computing systems to act without being explicitly programmed. Classical machine learning includes various clustering and classification techniques, including K-means clustering, linear and logistic regressions, stochastic gradient decent, association rule learning, and the like. Deep learning is a newer frontier in machine learning. Deep learning is a class of machine learning algorithms that uses multiple layers of nonlinear processing units for feature extraction and transformation. Deep learning algorithms can be unsupervised (e.g., pattern analysis) or supervised (e.g., classification). The deep learning algorithm can be implemented using layers of an artificial neural network (ANN) (referred to herein as a "neural network").

In general, a neural network is a collection of nodes (i.e., the "neurons") that are connected in a graph. A node in a neural network computes a sum of weighted inputs and adds an optional bias to the sum. The output of the node is a function of the final sum (referred to as an "activation function"). Example activation functions include the sigmoid function, the hyperbolic tangent (tan h) function, the Rectified Linear Unit (ReLU) function, and the identity function. Neural network models are often organized into layers of nodes, which define a specific topology, and corresponding weights and biases. The weights and biases are referred to as network parameters.

In general, a neural network includes an input layer and an output layer and can optionally include one or more hidden layers between the input and output layers. A neural network used in deep learning applications typically includes many hidden layers, which gives rise to the term deep neural network (DNN). The layers of a neural network can be densely connected (e.g., each node in a layer is fully connected to all nodes in a previous layer) or sparsely connected (e.g., each node in a layer is connected to only a portion of the nodes in a previous layer). A convolutional neural network (CNN) is a type of DNN that includes one or more sparsely connected layers, referred to as convolutional layers. A CNN is well-suited for processing image or video data. Other types of DNNs include recurrent neural network (RNNs), which are well-suited for processing speech and text data.

A modem field programmable gate array (FPGA) provides millions of look up tables and thousands of digital signal processing (DSP) and random access memory blocks (BRAM) that can be utilized to create massively parallel hardware systems. The programmable logic in the FPGA can form one or more kernels which can execute neural network accelerators (referred to generally as acceleration circuits) using the parallel hardware systems.

Increasing the utilization of the FPGA can improve the performance of the neural network application. Thus, the greater amount of time the FPGA is busy executing the tasks providing by the neural network application, the quicker the neural network can process and provide results. However, neural network designers may not have the required skill and expertise needed to fully utilize the neural network accelerators on the FPGA.

SUMMARY

Techniques for scheduling a neural network are described. One example is a method for pipelining tasks submitted to a neural network accelerator. The method includes receiving a first task from a neural network application to be processed by the neural network accelerator, generating a packet that contains the information used by multiple stages in a pipeline, and processing the packet at the multiple stages where at least one of the multiple stages performs a call to a hardware system executing the neural network accelerator and where the pipeline processes at least one other packet corresponding to a second task in parallel with processing the packet. The method also includes returning results of processing the packet using the pipeline to the neural network application.

Another example is a non-transitory computer-readable storage medium storing instructions, which when executed on one or more processing devices, perform an operation for pipelining tasks submitted to a neural network accelerator. The operation includes receiving a first task from a neural network application to be processed by the neural network accelerator, generating a packet that contains the information used by multiple stages in a pipeline, and processing the packet at the multiple stages where at least one of the multiple stages performs a call to a hardware system executing the neural network accelerator and where the pipeline processes at least one other packet corresponding to a second task in parallel with processing the packet. The operation also includes returning results of processing the packet using the pipeline to the neural network application.

Another example is a computing system that includes a processor and memory. The memory includes a library which, when executed by the processor, performs an operation. The operation includes receiving a first task from a neural network application to be processed by the neural network accelerator, generating a packet that contains the information used by multiple stages in a pipeline, and processing the packet at the multiple stages where at least one of the multiple stages performs a call to a hardware system executing the neural network accelerator and where the pipeline processes at least one other packet corresponding to a second task in parallel with processing the packet. The operation also includes returning results of processing the packet using the pipeline to the neural network application.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
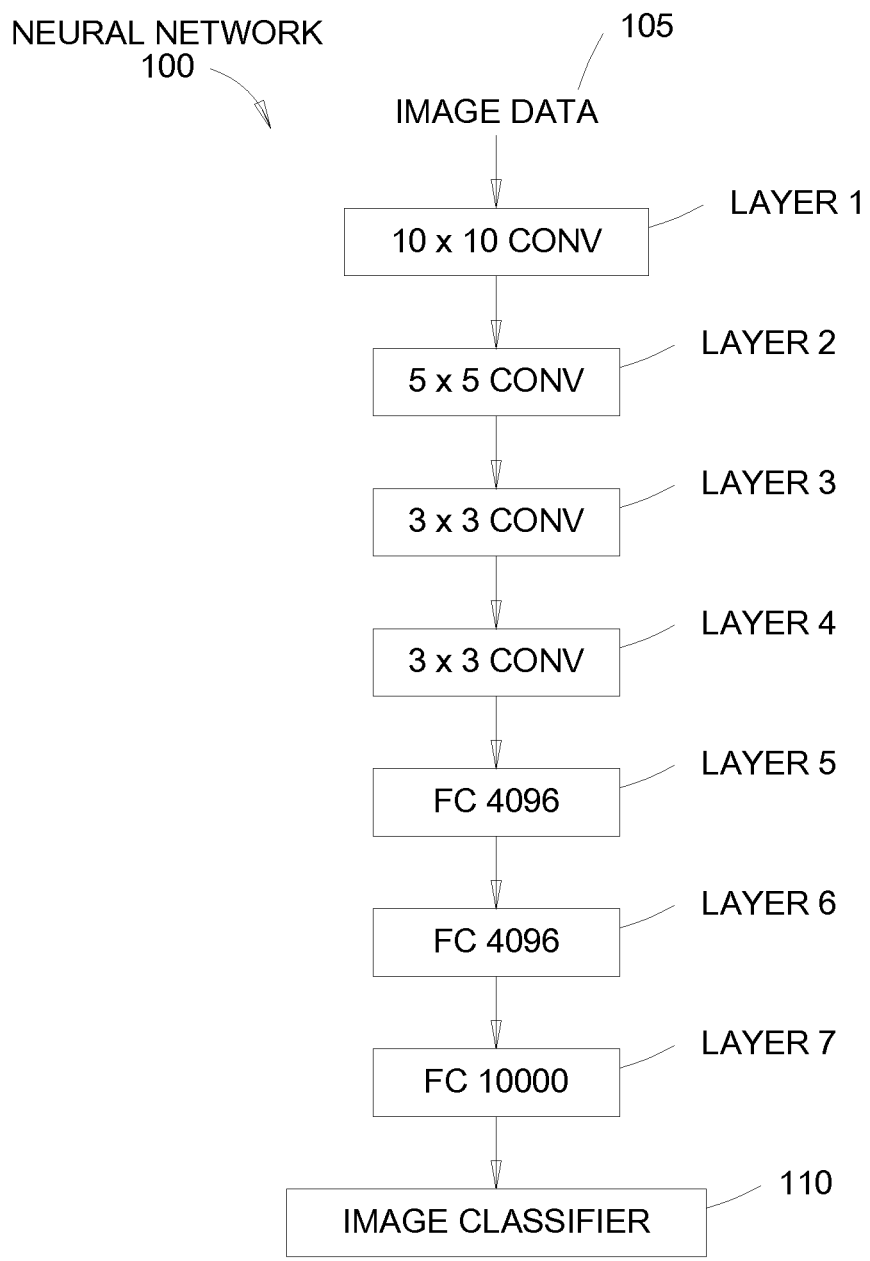
FIG. 1 illustrates a multi-layer neural network, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for interfacing a neural network application with a neural network accelerator using a library. For example, the neural network application may execute on a host computing system while the neural network accelerator executes on a massively parallel hardware system, e.g., a FPGA, a graphics processing unit (GPU), or a special designed application specific integrated circuit (ASIC). In one embodiment, the library (which can also be referred to as an interface engine or adapter between the accelerator and the neural network application) includes code that operates a pipeline for submitting the tasks received from the neural network application to the neural network accelerator. In one embodiment, the pipeline includes a pre-processing stage, an FPGA execution stage, and a post-processing stage which each correspond to different threads. When receiving a task from the neural network application, the library generates a packet that includes the information required for the different stages in the pipeline to perform the tasks. Because the stages correspond to different threads, the library can process multiple packets in parallel. That is, the library can process a first packet at the pre-processing stage while a second packet is at the execution stage and a third packet is at the post-processing stage. Doing so may increase the utilization of the neural network accelerator on the massively parallel hardware system. That is, during each processing cycle, the library can submit a different packet (or task) at the execution stage thereby minimizing downtime where the neural network accelerator is waiting on new data or for the library to retrieve already processed data.

In one embodiment, the library maintains a memory map between the memory blocks in the host computing system allocated to the neural network application and the memory blocks in the massively parallel hardware system allocated to the neural network accelerator. The library can detect changes to the memory blocks in the host computing system and automatically mirror those changes in the memory blocks in the massively parallel hardware system. In another example, the library can perform one write to the memory blocks in the massively parallel hardware system and then use an offset address according to the memory map to reduce the amount of data transferred between the two systems.

In another embodiment, the library provides metrics regarding the utilization of the neural network accelerator. These metrics can be visually outputted in real-time (or with a delay) to the operator of the neural network who can then identify adjustments for the pipeline. For example, if the neural network accelerator can finish processing a packet during the execution stage before the next packet is available from the pre-processing stage, the operator can assign additional hardware resources (e.g., more processing power) to the thread executing the pre-processing stage to speed up the overall execution of the pipeline.

FIG. 1 illustrates a multi-layer neural network 100, according to an example. As used herein, a neural network 100 is a computational module used in machine learning and is based on a large collection of connected units called artificial neurons where connections between the neurons carry an activation signal of varying strength. The neural network 100 can be trained from examples rather than being explicitly programmed. In one embodiment, the neurons in the neural network 100 are connected in layers—e.g., Layers 1, 2, 3, etc.—where data travels from the first layer—e.g., Layer 1—to the last layer—e.g., Layer 7. Although seven layers are shown in FIG. 1, the neural network 100 can include hundreds or thousands of different layers.

Neural networks can perform any number of tasks such as computer vision, feature detection, speech recognition, and the like. In FIG. 1, the neural network 100 detects features in a digital image such as classifying the objects in the image, performing facial recognition, identifying text, etc. To do so, image data 101 is fed into the first layer in the neural network which performs a corresponding function, in this example, a 10×10 convolution on the image data 101. The results of that function is then passed to the next layer—e.g., Layer 2—which performs its function before passing the processed image data to the next level, and so forth. After being processed by the layers, the data is received at an image classifier 102 which can detect features in the image data.

The layers are defined in a sequential order such that Layer 1 is performed before Layer 2, Layer 2 is performed before Layer 3, and so forth. Thus, there exists a data dependency between the lower layers and the upper layer(s). Although Layer 2 waits to receive data from Layer 1, in one embodiment, the neural network 100 can be parallelized such that each layer can operate concurrently. That is, during each clock cycle, the layers can receive new data and output processed data. For example, during each clock cycle, new image data 101 can be provided to Layer 1. For simplicity, assume that during each clock cycle a new image is provided to Layer 1 and each layer can output processed data for image data that was received in the previous clock cycle. If the layers are implemented in hardware to form a parallelized pipeline, after seven clock cycles, each of the layers operates concurrently to process image data (albeit on seven different images). Thus, implementing the layers in hardware to form a parallel pipeline can vastly increase the throughput of the neural network when compared to operating the layers one at a time. The timing benefits of scheduling the layers in a massively parallel hardware system improve further as the number of layers in the neural network 100 increases.

Figure 2:
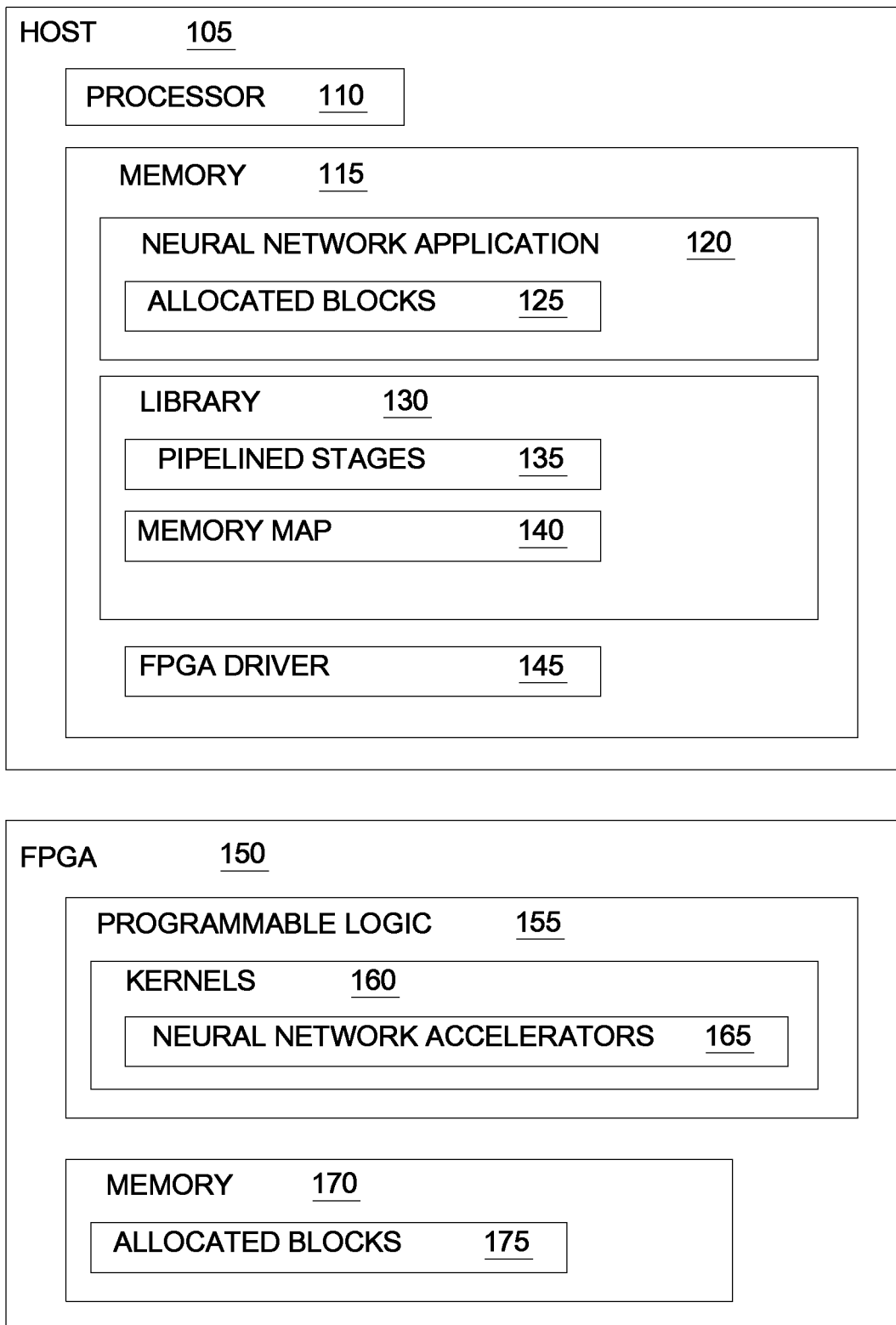
FIG. 2 is a system for interfacing a neural network accelerator with a neural network application, according to an example.

FIG. 2 is a system 200 for interfacing a neural network accelerator 165 with a neural network application 120, according to an example. The system 200 includes a host 105 (e.g., a host computing system) and a FPGA 150. Although an FPGA is specifically shown, the embodiments herein can be used to interface a neural network accelerator 165 (e.g., an acceleration circuit or kernel accelerator circuit) hosted on any type of hardware system—e.g., a GPU or ASIC—with the neural network application 120 using a library 130.

The host 105 includes a processor 110 and a memory 115. The processor 110 represents any number of processing elements that each can include any number of processing cores. The memory 115 can include volatile memory elements, non-volatile memory elements, and combinations thereof. Moreover, the memory 115 can be distributed across different mediums (e.g., network storage or external hard drives).

The memory 115 includes the neural network application 120 which in one embodiment is a software application executed by the processor 110; however, in other examples, the neural network application 120 can include hardware elements. The neural network application 120 establishes the neural network—e.g., the neural network 100 shown in FIG. 1—which can have any number of layers that perform different functions—e.g., convolution, Max-pooling, im2col, matrix multiplication, and the like. Although not shown, the neural network application 120 can use the neural network to process data (e.g., image or audio data) stored in the memory 115 or from external sources. For example, the host 105 may be communicatively coupled to a web portal that permits users to submit images that are then processed by the neural network application 120.

In the embodiments that follow, the neural network application 120 is communicatively coupled to the neural network accelerators 165 on the FPGA 150 which may improve the performance of the neural network—e.g., enable the neural network to execute the plurality of layers quicker rather than relying solely on the processor 110. However, the neural network application 120 may processes data using a different format than the neural network accelerator 165. Further, the memories of the host 105 and the FPGA 150 may be different, non-coherent memories.

The library 130 provides methods and operations for communicatively coupling the neural network application 120 to the neural network accelerator 165. The library includes a memory map 140 (e.g., a data structure or database) that maps allocated blocks 125 of memory for the neural network application 120 to allocated blocks 175 of memory for the neural network accelerators 165 in the FPGA 150. In one embodiment, the host 105 may allocate a large chunk of memory (i.e., the allocated blocks 125) for the neural network application 120 which stores different images to be processed. For example, when processing different images, the neural network application 120 may transmit to the library 130 an offset into the allocated blocks 125 where a particular image is stored. Using the memory map 140, the library can identify the corresponding allocated block or blocks 175 in the FPGA 150. In one embodiment, the library 130 generates the memory map 140 after the host 105 and the FPGA 150 allocate the blocks 125 and the block 175 so that data corresponding to the same image or audio file can be correctly correlated between the memory 115 in the host 105 and memory 170 in the FPGA 150.

In addition, the library 130 includes pipelined stages 135 which process the tasks submitted by the neural network application 120 to be completed by the neural network accelerator 165. That is, instead of receiving a task from the neural network application 120, submitting the task to the neural network accelerator 165, and waiting for results, the library 130 uses the pipelines stages 135 to process multiple tasks at different stages in parallel. In one embodiment, when receiving a new task, the library 130 generates a packet that includes the data used for completing the task. In one embodiment, the packets are self-contained such that each packet can be processed individually at the stages 135 without a having a data dependency on other packets in the pipeline. If the library 130 forms a pipeline with three stages 135 (e.g., a pre-processing stage, an FPGA execution stage, and a post-processing stage), the library 130 can process three packets (which can each correspond to a different task submitted by the application 120) in parallel using the three stages. Doing so can increase the utilization of the neural network accelerator and the overall runtime of the neural network.

In one embodiment, the library 130 permits a neural network operator to use the neural network accelerator 165 without the operator having to know how to configure or efficiently execute the neural network accelerator 165 in the FPGA 150. That is, the operator does not need to understand register transfer logic (RTL) which is typically used to configure the programmable logic 155 in the FPGA 150. Instead, the library 130 abstracts the communication between the neural network application 120 and the neural network accelerator 165 using the pipeline stages 135 and the memory map 140. Moreover, the library 130 can provide a generic application program interface (API) that can be used with different types of neural networks (and neural network applications) to communicate with the neural network accelerators 165.

The memory 115 also includes an FPGA driver 145 which enables communication between the host 105 and the FPGA 150. In one embodiment, the FPGA driver 145 enables the library 130 and its corresponding functions and operators to communicate with the FPGA 150. Moreover, the FPGA driver 145 can receive (or request) metrics regarding the hardware in the FPGA 150 such as the utilization of the programmable logic 155 and the memory 170. In one embodiment, the library 130 can use these metrics to output a visual representation of the utilization of the neural network accelerator 165 which can aid the operator when adjusting the pipelined stages 135 to increase throughput.

The FPGA 150 includes the programmable logic 155 and the memory 170. The programmable logic 155 can include an array of programmable logic blocks and a hierarchy of reconfigurable interconnects that enable the logic blocks to be communicatively coupled. In FIG. 2, the programmable logic 155 forms one or more kernels 160 which each can execute one or more neural network accelerators 165. In one example, the neural network accelerators 165 include the DSP blocks which are useful when performing convolutions for the neural network. In another embodiment, the accelerator 165 converts received image data into a 2D matrix (referred to as im2col) so that matrix multiplication can be used to perform convolution. However, the neural network application 120 can offload other types of neural network function to the neural network accelerator 165 such as Max-pooling which amplifies features in the image so the features are not lost when the image is scaled, a rectified linear unit (ReLU) which is an activation function or ramp function, and the like.

The memory 170 can include volatile and non-volatile memory elements such as DDR ram. When establishing communication between the neural network application 120, the FPGA 150 assigns the allocated blocks 175 to the neural network accelerators 165. However, because the memory 170 in the FPGA 150 may not be shared with the memory 115 in the host 105, the addresses for the allocated blocks 175 do not correspond with the addresses of the allocated blocks 125 in the host 105. Moreover, the allocated blocks 125 and 175 may not be contiguous blocks in memory or can be assigned at different times. As mentioned above, the library 130 includes a memory map 140 which can map the individual blocks in the allocated blocks 125 and 175 to each other. Thus, when the library 130 receives a task for an image located at Address A in the allocated blocks 125, the library 130 can convert that address to Address B in the allocated blocks 175 for performing that task. Similarly, when reading results from the allocated blocks 175, the library 130 can map the address to a corresponding destination address for storing the results in the allocated blocks 125.

Figure 3:
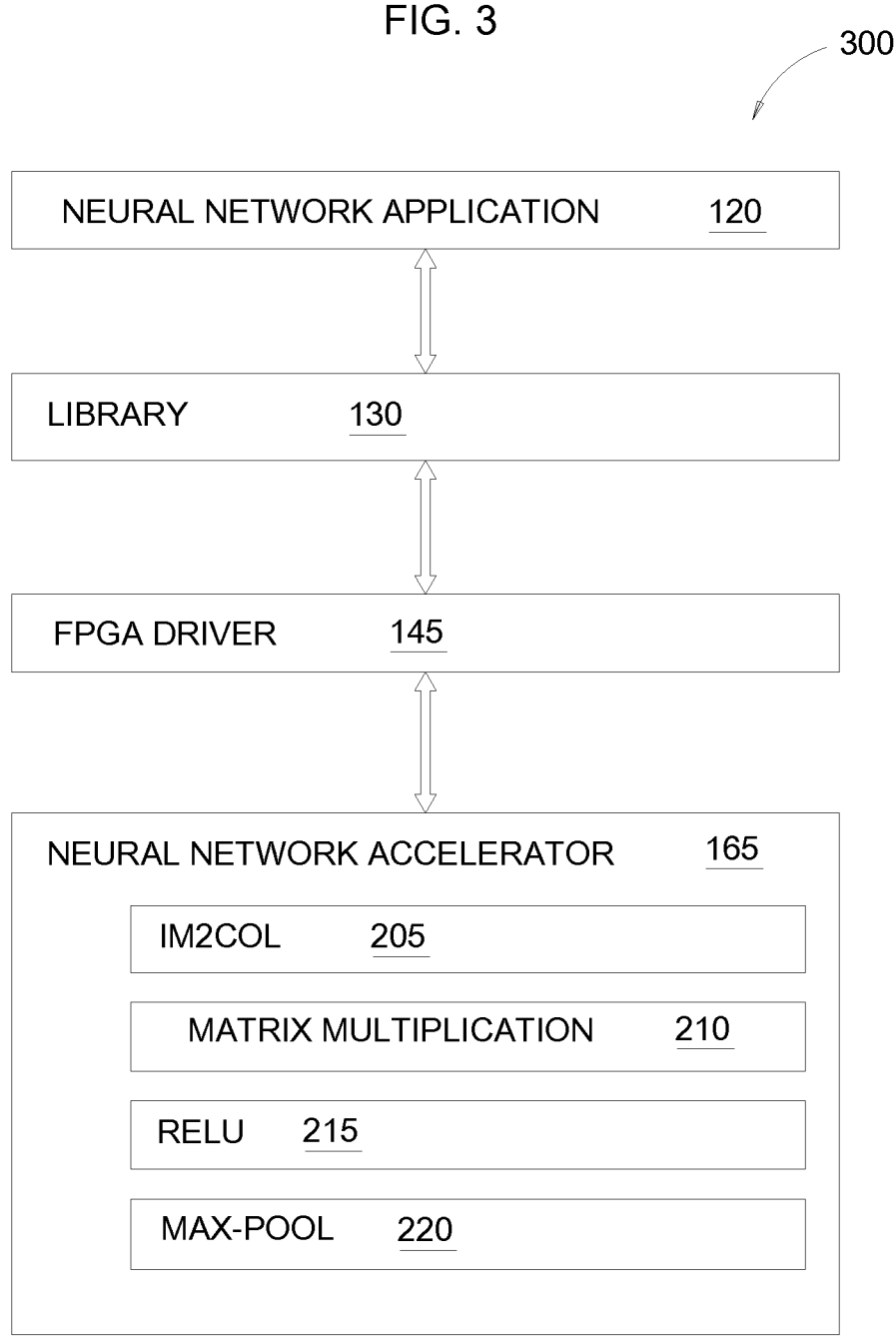
FIG. 3 illustrates communication flow between a neural network accelerator and a neural network application, according to an example.

FIG. 3 illustrates communication flow 300 between the neural network application 120 and the neural network accelerator 165, according to an example. As shown, the library 130 and the FPGA driver 145 are between the neural network application 120 and the neural network accelerator 165 in the communication flow 300. Thus, the neural network application 120 submits tasks to the library 130 which in turn uses the FPGA driver 145 to generate read/write commands and transmit data to the neural network accelerator 165.

The neural network accelerator 165 can perform a variety of operations such as im2col 205, matrix multiplication 210, ReLU 215, and max-pooling 220 to complete the task assigned by the neural network application 120. In one embodiment, the neural network application 120 submits a task for the neural network accelerator 165 to perform a single layer of the neural network—e.g., perform a 10×10 convolution or perform max-pooling. The network accelerator 165 can also perform operations such as convolution directly without going through separate im2col/matrix multiplication steps. In another embodiment, the neural network application 120 can submit a task on a per-image basis in which case the library 130 and FPGA driver 145 instruct the neural network accelerator 165 to perform all the layers in the neural network to process the image rather than a selected one the layers in the neural network.

The neural network accelerator 165 includes logic (e.g., programmable logic if implemented on an FPGA) for performing one or more functions such as im2col 205, matrix multiplication (MM) 210, ReLU 215, max-pooling 220, and the like. In one embodiment, these functions can be pipelined such that the logic blocks forming the neural network accelerator 165 can execute in parallel. That is, the hardware logic in the neural network accelerator 165 can be parallelized along with the functions provided by the library 130.

Moving in the reverse direction, after processing the tasks, the neural network accelerator 165 transfers the processed data to the FPGA driver 145 which forwards the data to the library 130. Using one or more pipelined stages, the library 130 processes the results and transmits the results to the neural network application 120. In one embodiment, the library 130 changes the format of the when transmitting data from the neural network application 120 to the accelerator 165 as well as when transmitting results from the accelerator 165 to the application 120. The library 130 may use pipeline stages to process multiple tasks at the same time.

Figure 4:
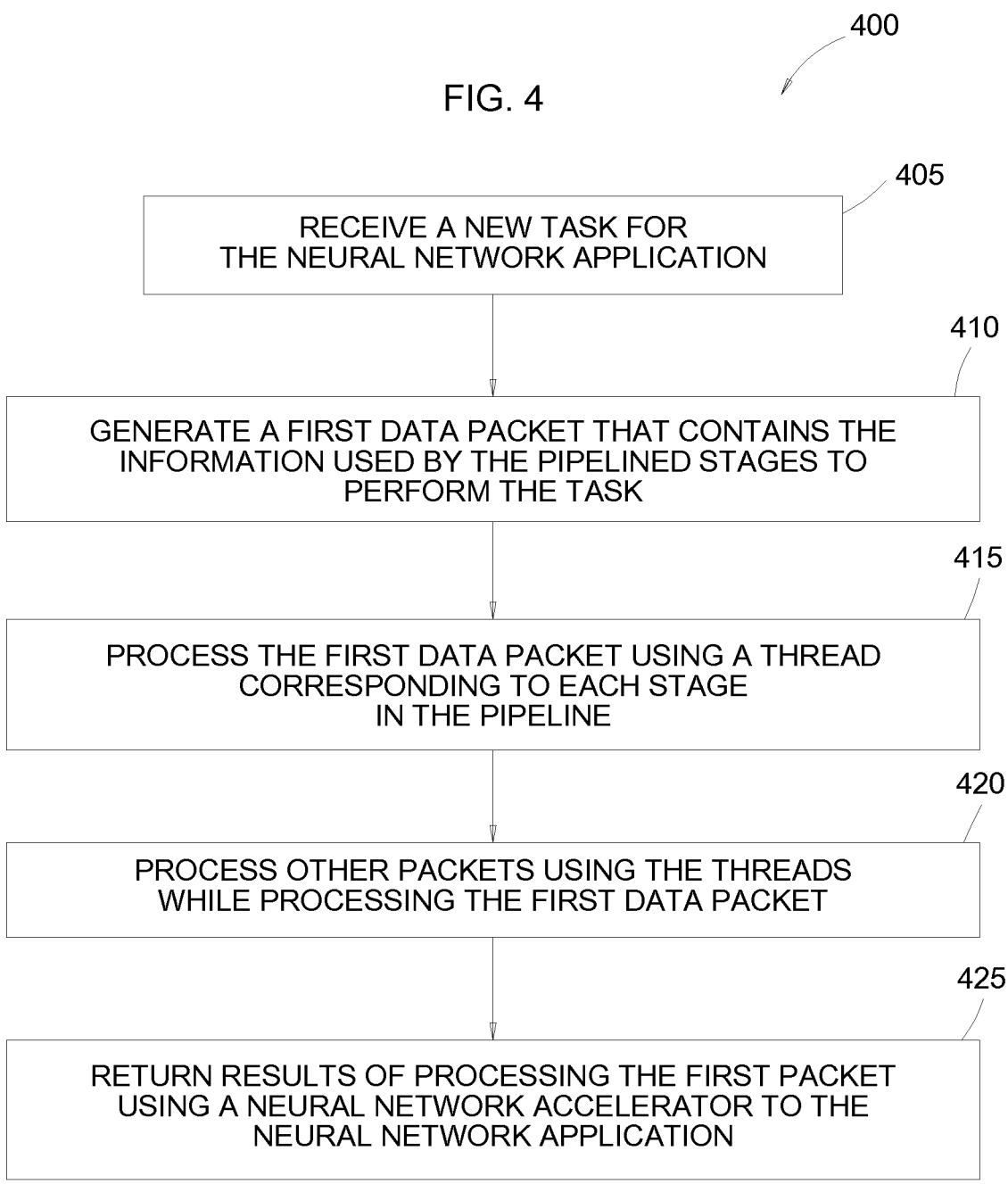
FIG. 4 is a flowchart for pipelining tasks received from a neural network application for execution in a neural network accelerator, according to an example.

FIG. 4 is a flowchart of a method 400 for pipelining tasks received from a neural network application for execution in a neural network accelerator, according to an example. At block 405, the library receives a new task from the neural network application. In one embodiment, the task includes a memory address in host memory which stores the data the neural network application wants the neural network accelerator to process. The memory address may be an offset relative to a start memory address for a block of memory allocated to the neural network application. For example, the host may allocate a large block of memory to the neural network application then reference sub-blocks within the memory using a memory offset.

In one embodiment, the memory map in the library stores pointers which map the sub-blocks of allocated memory in the host to corresponding blocks of memory in the FPGA executing the neural network accelerator. For example, the neural network application may reference a particular image which is stored in one of the sub-blocks. Using the memory map, the library can identify the corresponding address block in the FPGA. Thus, the memory map can synchronize the memory in the host allocated to the neural network application to the memory in the FPGA allocated to the neural network acceleration. In one embodiment, the library can mirror any changes made in the memory allocated to the neural network application to the memory allocated to the neural network accelerator. However, the library can choose when and if the changes in memory are propagated to the other platform. Because DDR memory transfer is expensive, the library may minimize DDR transfers to the host and keep data on the FPGA as much as possible. For example, if the neural network accelerator executes four convolutions sequentially (e.g., conv1→conv2→conv3→conv4) on FPGA, the library may not automatically sync all the inputs/outputs of the convolution operations but instead only sync the first and last of the convolution operations to the memory in the host. That is, any changes made in the memory in the host are automatically propagated to the corresponding memory in the FPGA and vice versa. In one embodiment, the library can populate the memory map and the pointers used to map the memories when the memories are allocated in the host and FPGA.

Moreover, the library can spend significant amounts of time transferring data between the host and the FPGA. Neural networks use weights to characterize the amplitude of the connections between the neurons in the network. The weights used for each layer of the neural network may differ. Thus, when the transferring a task to the neural network accelerator, the neural network application may also transmit the weights for the layer or layers. The neural network accelerator may execute the neural network multiple times (e.g., each time a new image is received) which may mean the library transmits the weights to the FPGA each time the layer or layers is executed. Instead, in one embodiment, the library sends the weights for the layers performed by the neural network accelerator in one transfer. In one embodiment, the library sends the weights to the FPGA in a large matrix. When the library receives a new task which requires a different layer with different weights, instead of transferring the weights, the library can transmit an offset into the matrix identifying which subset of the weights should be used to perform the task. In this manner, the library can transmit the weights in one transfer and then use offset memory addresses to identify the relevant weights in the matrix for a particular task.

In one embodiment, the library uses flags in the memory map to identify what data has been transferred to the FPGA. For example, after transferring the weights to the FPGA, the library can flag the memory address in the host which stores the weights. Thus, whenever the neural network application sends a flagged memory address to the library, the library can determine that the data stored at that memory address has previously been sent to the FPGA. Instead of resending the data, the library can send only the corresponding address where the data is stored in the FPGA. In addition to the weights, the library may use the flags to indicate image data or audio data that was previously transferred to the FPGA.

In one embodiment, when memory is allocated, the library saves new memory blocks into a used set, and when instructed to free memory, the library moves the blocks from the used set to an unused set. Whenever possible, the library attempts to reuse the unused memory blocks before allocating different memory. Put differently, when receiving a request for allocating memory, the library first attempts to allocate the memory from the unused set since this can reduce the occurrence of memory fragmentation from aligned memory blocks. Moreover, doing so takes advantage of the nature of deep neural networks where the size and pattern of memory allocated in each forward propagation can be identical.

At block 410, the library generates a first data packet that contains the information used by the pipelined stages to perform the task. In one embodiment, the data packet contains all the information needed for each of the pipelined stages to perform their jobs. For example, each stage may use a different field or fields in the packet when processing the packet. Thus, one stage may use a first field in the packet but not a second field while another stage uses the second field but not the first field. A non-limiting example of the fields that the library can populate in the packet include matrix dimensions, memory offset to the weights, memory address of the data to be processed, memory address where the results should be stored, memory offsets into the host memory, and the like. In one embodiment, the library can customize the fields for different neural network accelerators (e.g., different kernels). That is, different types of accelerators or different kerns may use different fields.

At block 415, the library processes the first data packet using a thread corresponding to each stage in the pipeline. In one embodiment, each thread (i.e., each stage) can process a packet at the same time the other threads process other packets. In this manner, the pipeline can process different packets corresponding to different tasks in parallel. Moreover, the packets from one stream can be processed in parallel with packets from other streams. For example, the neural network application may receive a first stream of images from a web portal and a second stream of images saved in local memory. The library can generate independent packets from images in the two streams which can be processed by the pipelined stages in parallel. That is, because the packets are self-contained or independent from each other, the pipeline can process packets from different sources in parallel.

Figure 5:
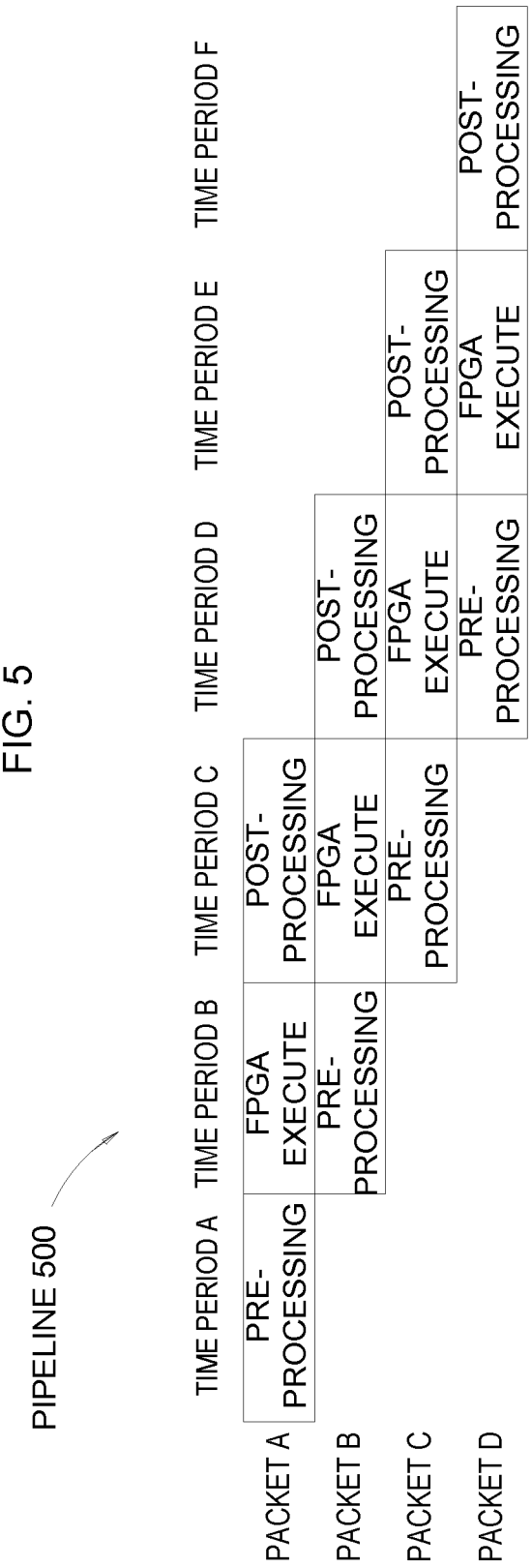
FIG. 5 illustrates a pipeline for tasks submitted by a neural network application, according to an example.

FIG. 5 illustrates a pipeline 500 for tasks submitted by a neural network application, according to an example. The pipeline 500 includes three stages: a pre-processing stage, an FPGA execute stage, and a post-processing stage. Each packet passes through each stage, but in other embodiments, some packets may skip one or more of the stages. For example, the data in one packet may be formatted in such a way that the library does not need to perform the pre-processing and post-processing stages.

In FIG. 5, four packets are processed by the pipeline 500 during Time Periods A-F. During Time Period A, Packet A is processed by the thread corresponding to the pre-processing stage. During Time Period B, the pre-processing stage (which has finished processing Packet A) processes Packet B while the FPGA execute stage processes Packet A. During Time Period C, the pre-processing stage processes Packet C in parallel with the FPGA execute stage processing Packet B and the post-processing stage processing Packet C. So long as new tasks are received from the neural network application, the pipeline 500 can process three packets in parallel during each time period.

In one embodiment, the duration of the time period is set according to the stage that executes the longest. Stated differently, the library waits until all the stages during the time period have completed before passing the packets to the next stage in the pipeline and starting the subsequent time period. For example, if the pre-processing stage takes the longest to complete, then the library waits until this stage is complete before moving to the next time period which means the FPGA execute and the post-processing stages have already completed and are idle. In one embodiment, the duration of the stages may vary which can cause the durations of the time periods to vary. That is, during Time Period C the FPGA execute stage can take the longest to execute but during Time Period D the post-processing stage takes the longest to execute.

In one embodiment, the library uses locking functions to control the flow of packets between the stages and when new time periods start. For example, when the pre-processing thread is finished processing a packet, the thread can lock the input queue for the FPGA execute thread. While locked, the thread can move the results from processing the packet from the output buffer of the pre-processing thread to the input queue of the FPGA execute stage, unlock the queue, and signal the thread of the FPGA execute stage that the next packet is ready to be processed. Locking the stage mitigates the likelihood that data can become corrupted when handing off the packets between the stages.

In one embodiment, the pre-processing stage alters the data received from the neural network application into a format that can be processed by the hardware executing the neural network accelerator. In one example, the neural network application may process data in a floating point format (e.g., a 32-bit floating point) but the hardware logic in the FPGA operates on fixed point values (e.g., a 16-bit or 8-bit fixed point). The pre-processing stage converts the floating point values into fixed point values that can be processed by the neural network accelerator.

Moreover, the pre-processing stage can convert the data received from the neural network application into a matrix format (e.g., a 32×64 block of data). A matrix of data may help to perform the operations of the neural network accelerator during the FPGA execute stage in parallel. Once the pre-processing stage is complete, the data in the packet is arranged in a format that can more easily be processed by the hardware logic in the FPGA.

During the FPGA execution stage, the corresponding thread transmits the packet (or a portion of the data therein) to the FPGA. For example, thread for the execute stage may transmit the fields of the packets (e.g., memory addresses) which indicate where the corresponding data and weights are stored in memory. In one embodiment, the thread for the FPGA execution stage performs writes a portion of the packet to the appropriate memory in the FPGA (using the memory map), monitors the kernel executing the neural network accelerator, and performs a read to retrieve the processed results from the memory in the FPGA. In one embodiment, the thread uses enqueue commands to move the data to the FPGA, instruct the kernel or kernels to execute, and read the results from buffers corresponding to the kernel. In this manner, the thread of the FPGA execution stage (which operates on the host) can transmit commands to the FPGA in order to control and monitor the neural network accelerator. Once the neural network accelerator is finished and the results are retrieved, the thread of the FPGA execution stage passes the updated packet to the post-processing stage.

In one embodiment, the post-processing stage converts the data in the packet from a data format used by the FPGA to the data format used by the neural network application. For example, the thread of the post-processing stage performs a reverse conversion relative to the pre-processing stage. For instance, the results from the FPGA may be converted from fixed point values to floating point values. Moreover, the thread may no longer store the data as matrices.

After completing the post-processing stage, the library stores the relevant data in host memory and informs the neural network application that the task is complete. In one embodiment, library saves only a portion of the packet into memory. For example, the fields in the packet may be used only by the pipeline stages, and thus, are discarded when the packet has traversed the pipeline 500.

While FIG. 5 illustrates a pipeline 500 that includes three stages, the library can establish a pipeline that includes any number of stages. For example, for some neural network applications, the library may use only a FPGA execute stage and a post processing stage. For other applications, the library may include a pipeline with more than three stages where the packet is passed between different neural network accelerators in the same FPGA or in different FPGAs.

Returning to method 400, at block 420, the library processes other packets using the threads while processing the first data packet. That is, the pipeline 500 shown in FIG. 5 can process multiple threads in parallel. Thus, while the pre-processing stage processes the first packet, the FPGA execute stage and the post-processing stage process other packets at the same time (assuming the neural network application has submitted multiple tasks). As a result, the pipeline can reduce downtime and improve utilization of the kernel executing the neural network accelerator. For example, once the neural network accelerator finishes processing the current packets, the packet processed by the pre-processing stage can be transferred to the FPGA so that the neural network accelerator can immediately begin processing that packet.

At block 425, the library returns the results of processing the first packet using the neural network accelerator to the neural network application. That is, once the first packet has traversed the pipeline (e.g., the pre-processing stage, the FPGA execute stage, and the post-processing stage), the library can store the results into the allocated memory for the neural network application and indicate to the application that the task has been complete. Because the stages are pipelined, the library can process multiple tasks (or packets) in parallel. Thus, at the end of each time period, the library may transfer results of completing a task to the neural network application. If the stages were not pipelined, the library has to wait for a task to complete before starting a new task submitted by the neural network application. In that case, the neural network accelerator is idle when the library performs the pre-processing and post-processing operations.

Figure 6:
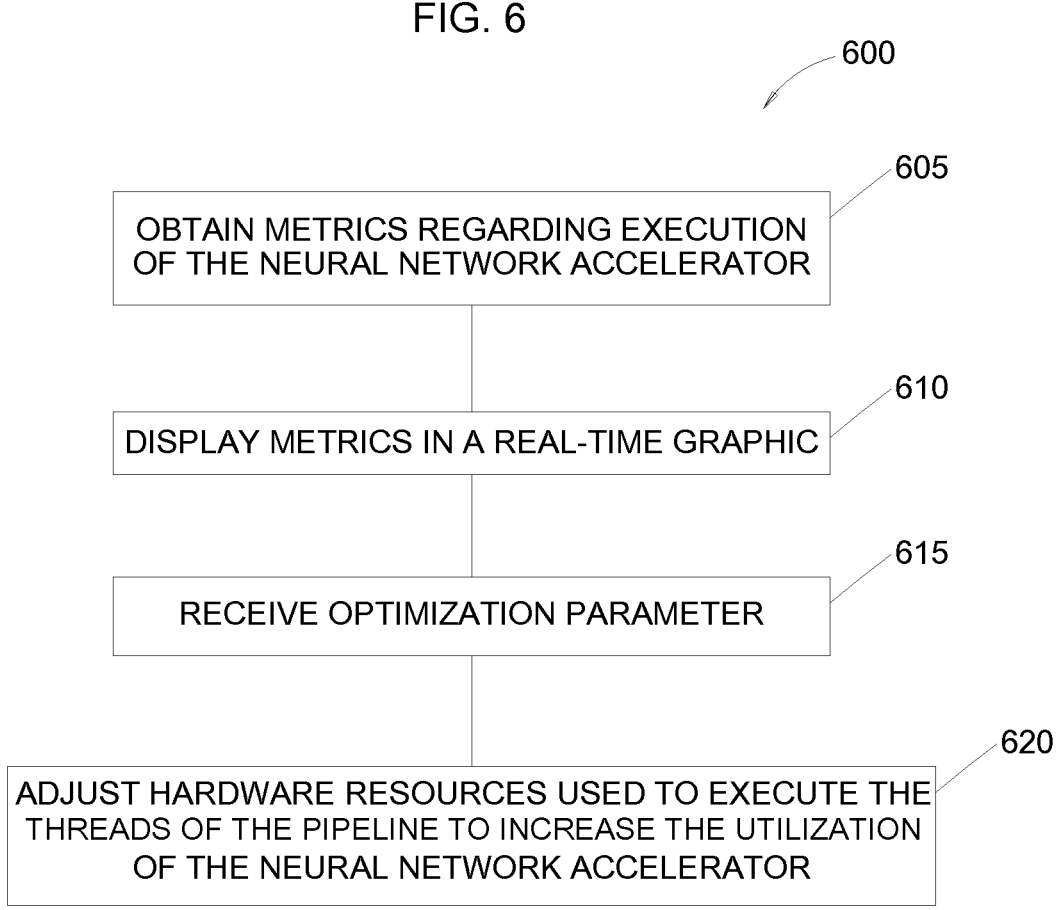
FIG. 6 is a flowchart for adjusting execution of the pipeline for tasks submitted by the neural network application, according to an example.

FIG. 6 is a flowchart of a method 600 for adjusting execution of the pipeline for tasks submitted by the neural network application, according to an example. At block 605, the library obtains metric regarding execution of the neural network accelerator. In one embodiment, the library communicates with the FPGA driver which permits the library to monitor the hardware elements in the FPGA. For example, the driver may report metrics to the library such as when the kernels or compute nodes executing the neural network accelerators begin to execute and how long before the job completes. Moreover, the driver can report on reads and writes to memory and how long those read and writes take (which can vary depending on the amount of data being read or written).

In one embodiment, the library can request this data from the driver. Alternatively, the driver may automatically monitor a hardware interface for the FGPA and report these metrics to the library.

At block 610, the library displays the metrics in a real-time graphic. In one embodiment, the library outputs a chart which indicates the utilization of one or more kernels executing neural network accelerators in the FPGA. The chart enables the operator of the neural network to visualize the utilization of the kernels and identify ways to improve the pipeline established by the library.

Figure 7:
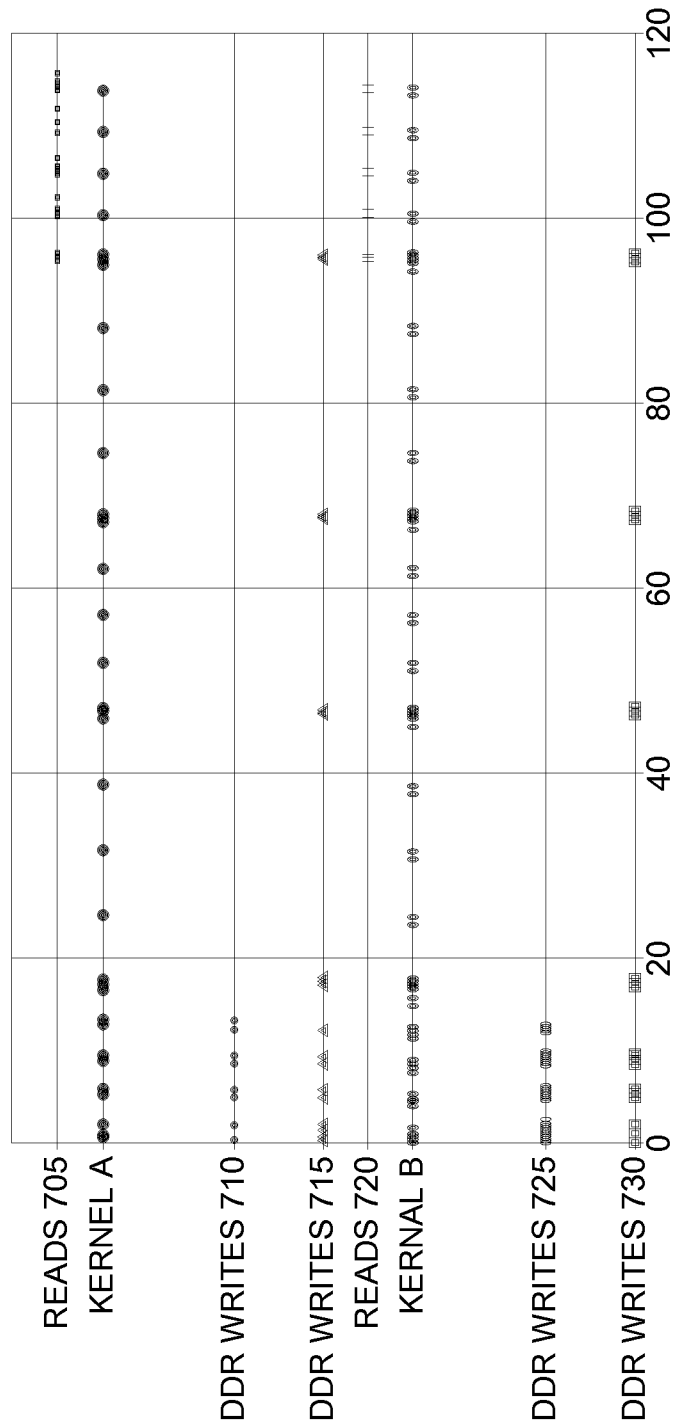
FIG. 7 is a timing chart corresponding to pipelining the tasks submitted by the neural network application, according to an example.

FIG. 7 is a timing chart 700 corresponding to pipelining the tasks submitted by the neural network application, according to an example. The chart 700 includes reads 705, DDR writes 710, and DDR writes 715 for processing packets using Kernel A and reads 720, DDR writes 725, and DDR writes 730 for processing packets using Kernel B. In this embodiment, the FPGA includes two kernels which can, in parallel, execute two neural network accelerators. Put differently, during the FPGA execute stage of the pipeline, the library can submit tasks to be performed by Kernels A and B in parallel.

Moreover, in this embodiment, the library submits a batch of tasks to the kernels. Here, the library submits eight tasks or packets as a batch to each of the kernels. In turn, the kernels process the eight tasks sequentially. For example, the DDR write 710 may include an N number dots representing the library writing data for N number of tasks into memory allocated for Kernel A and the corresponding neural network accelerator. Similarly, the DDR writes 725 also include the same N number of dots representing a different batch of N number of tasks being written into memory allocated for Kernel B. The DDR writes 715 indicate times when information from the packet generated by the library is transferred to the FPGA.

The circles for Kernel A and the X's for Kernel B indicate when these kernels begins to process a task while the lines indicate the length of time these tasks take. As shown, the kernels are executing a task almost constantly. That is, the kernels have a high rate of utilization. This is shown visually by the fact that there is very little, if any, space (or gaps) between when the kernels finish a task and begin a new task.

The reads 705 and 720 illustrate when the library retrieves the results from the kernels processing the tasks. The reads 705 include an N number squares indicating reading results provided by Kernel A and the reads 720 include an N number of plus signs indicating reading results provided by Kernel B. In this manner, the chart 700 visualizes the utilization of the Kernels A and B as well as the reads and writes into memory which can help the operator of the neural network determine the utilization or efficiency of the neural network accelerators executing on the kernels.

In one embodiment, the library updates the chart 700 in real-time. That is, the library can generate the chart (starting from left to right) as the kernels are executed and the read and writes are performed. Thus, the operator can watch the chart 700 being generated. In one embodiment, the operator can zoom in on the chart or move the chart back in time to view past results.

Although a timing chart is shown, the metrics for the kernels and the DDR memory in the FPGA can be displayed in other ways. Instead of a timing chart, the library can output a utilization percentage which indicates the ratio of idle time and execution time. In another example, the library can output a bar graph which illustrates the average utilization of the kernels.

Returning to method 600, at block 615, the library receives optimization parameters from the operator of the neural network which alters the execution of the pipeline stages. When viewing the chart 700, the operator may have identified that the pre-processing stage typically takes longer to execute than the FPGA execution stage and post-processing stage. As a result, the kernels may be idle while waiting for the pre-processing stage so that a new packet (or batch of packets) can be submitted for processing by the neural network accelerators. In response, the operator can provide an optimization parameter which alters the execution time of one or more of the pipeline stages. In this example, the optimization parameter may reduce the duration of the pre-processing stage.

In one embodiment, the optimization parameter is the amount of hardware resources assigned to execute the threads of the pipeline stages. For example, if the pre-processing stage constantly requires more time to execute than the other stages in the pipeline, the operator can assign additional processing cores in the host to execute the pre-processing stage. Doing so may reduce its duration such that the pre-processing stage has a duration that is, on average, closer in duration to the other stages. As a result, the overall execution time of the pipeline may decrease and the utilization of the kernels in the FPGA can increase.

In another example, the optimization parameter may include assigning more virtual memory to the threads executing the pipelined stages or enabling the threads to use faster memory elements or communication buses. For example, the duration of the FPGA execution stage could be increased by permitting the library and driver to use a faster host-to-FPGA communication scheme (e.g., PCIe).

At block 620, the library adjusts hardware resources used to execute the threads of the pipeline to increase the utilization of the neural network accelerator according to the received optimization parameter. As mentioned above, the library may increase the number of processing cores assigned to execute a thread of one of the pipelined stages, permit the threads to use faster memory elements, or enable a faster communication path between the host and the FPGA.

In one embodiment, adjusting the hardware resources more closely aligns the durations of the stages in the pipeline. Put differently, the library can adjust the durations of the stages such that they are more equal which means the FPGA is utilized more efficiently. Doing so may increase the duration of some of the stages. For example, if the post-processing stage has a duration that is shorter than the FPGA execute stage but the pre-processing stage has a duration that is longer than the FPGA execute stage. The operator may assign processing cores previously assigned to execute the post-processing stage to the pre-processing stage. As a result, the duration of the post-processing stage increases and the duration of the pre-processing stage decreases. But if these durations are the same as the duration of the FPGA execute stage, the overall execution time of the pipeline and the utilization of the kernels executing the neural network accelerators can increase.

In one embodiment, the library includes a debugging function for switching between submitting tasks to the external neural network accelerator or to the host. For example, when debugging, instead of submitting the tasks to the FPGA, the library can execute the task using the processors on the host. This may take more time, but doing so can determine if a problem is caused by the design of the neural network or the neural network accelerator. Stated differently, by submitting the task to the host, the operator can determine if any errors are caused by executing the task on the FPGA. In this manner, the host processors can serve as a baseline for debugging FGPA features. In one embodiment, the library submits the same task to both the neural network accelerator on the FPGA and the processors on the host and compares the results.

Figure 8:
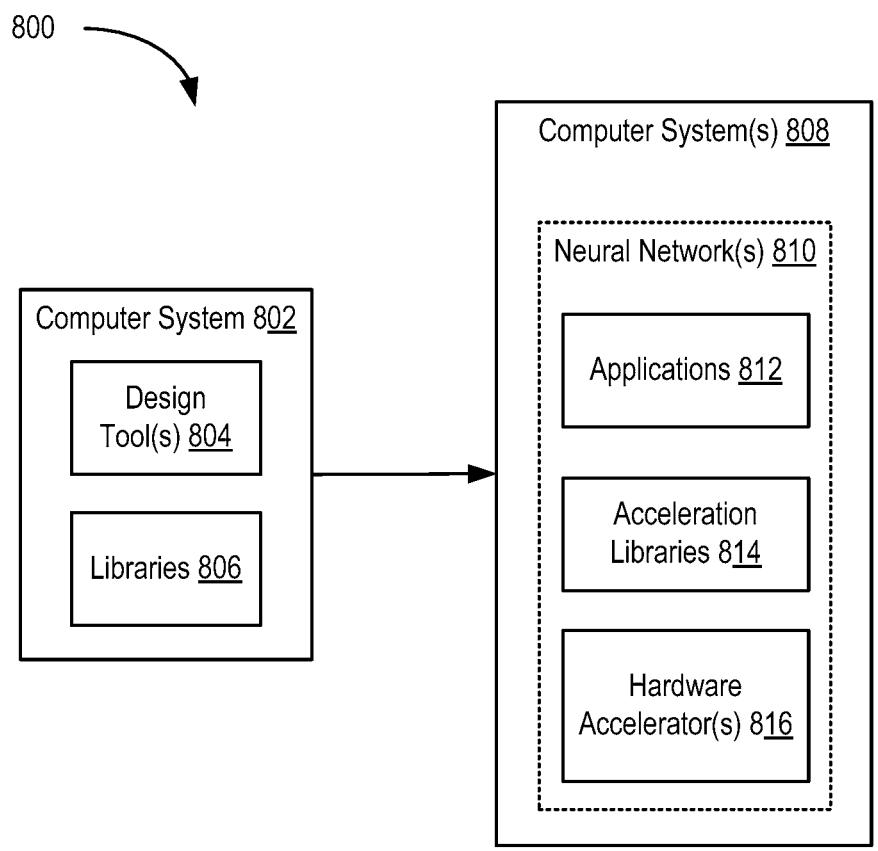
FIG. 8 is a block diagram depicting a system for implementing neural networks according to an example.

FIG. 8 is a block diagram depicting a system 800 for implementing neural networks according to an example. The system 800 includes a computer system 802 and one or more computer systems 808. The computer system 802 includes conventional computing components configured to execute software that provides one or more design tools 804. Each computer system 808 executes one or more neural networks 810 (as in any of the examples described above). The neural network(s) 810 are implemented using applications 812 (as in any of the examples described above), acceleration libraries 814 (as in any of the examples described above), and one or more hardware accelerators 816 (as in any of the examples described above).

In an example, the hardware accelerator(s) 816 include programmable ICs, such as FPGAs. The acceleration libraries 814 provide APIs to interface with the hardware accelerator(s) 816. The acceleration libraries 814 can also include libraries that provide neural network functions, including predefined and optimized implementations of neural network layers and other types of neural network structures. Thus, the neural network(s) 810 can include both hardware portions implemented in the hardware accelerator(s) 816, as well as software portions implemented in the acceleration libraries 814. The applications 812 invoke the APIs of the acceleration libraries 814 to program and control the hardware accelerator(s) 816 to implement the neural network(s) 816.

A designer interacts with the design tool(s) 804 to define the neural network(s) 810. The design tool(s) 804 can generate files for programming the hardware accelerator(s) 816 (e.g., configuration bitstreams for FPGAs), files that provide the acceleration libraries 814, and files that provide the applications 812. The designer can define the hardware portions of the neural network(s) 810 using a register transfer language (RTL) or using a programming language, such as C, C++, OpenCL, and the like, or a combination of RTL and programmable language(s). The user can define the software portions of the neural network(s) 810 using a programming language, such as C, C++, OpenCL, etc. The design tool(s) 804 compile the software-defined neural networks to generate files for programming the hardware accelerator(s) 816 and library files for the acceleration libraries 814. The designer can make use of libraries 106 that provide class libraries, template libraries, and the like to assist in developing the hardware and software portions of the neural network(s) 810.

A user can define the applications 812 using a programming language (e.g., C, C++, Python, etc.). The user can make use of neural network frameworks and libraries, such as Caffe, TensorFlow, MXNet, and the like.

Figure 9:
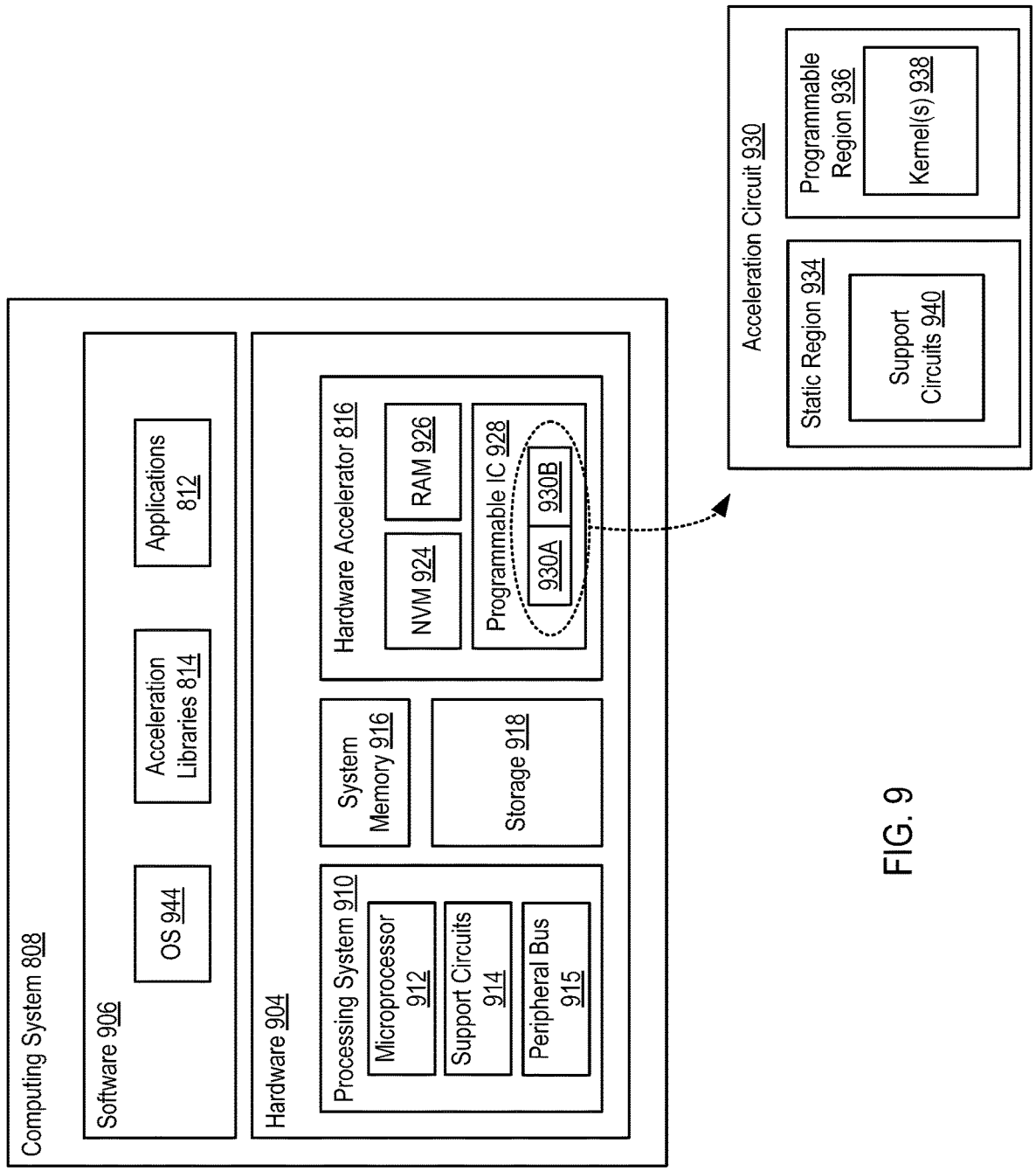
FIG. 9 is a block diagram depicting a computing system according to an example.

FIG. 9 is a block diagram depicting a computing system 808 according to an example. The computing system 808 includes hardware 904 and software 906 executing on the hardware 904. The hardware 904 includes a processing system 910, system memory 916, storage devices ("storage 918"), and a hardware accelerator 816. The software 906 includes an operating system (OS) 944, the acceleration libraries 814, and the applications 812.

The processing system 910 includes a microprocessor 912, support circuits 914, and a peripheral bus 915. The microprocessor 912 can be any type of general-purpose central processing unit (CPU), such as an x86-based processor, ARM®-based processor, or the like. The microprocessor 912 can include one or more cores and associated circuitry (e.g., cache memories, memory management units (MMUs), interrupt controllers, etc.). The microprocessor 912 is configured to execute program code that perform one or more operations described herein and which can be stored in the system memory 916 and/or the storage 918. The support circuits 914 include various devices that cooperate with the microprocessor 912 to manage data flow between the microprocessor 912, the system memory 916, the storage 918, the hardware accelerator 816, or any other peripheral device. For example, the support circuits 914 can include a chipset (e.g., a north bridge, south bridge, platform host controller, etc.), voltage regulators, firmware (e.g., a BIOS), and the like. The support circuits 914 manage data flow between the microprocessor 912 and the peripheral bus 915, to which various peripherals, such as the hardware accelerator 816, are connected. In some examples, the microprocessor 912 can be a System-in-Package (SiP), System-on-Chip (SoC), or the like, which absorbs all or a substantial portion of the functionality of the chipset (e.g., north bridge, south bridge, etc.). The peripheral bus can implement an expansion bus standard, such as Peripheral Component Interconnect Express (PCIe). In the example, the processing system 910 is shown separate from the hardware accelerator 816. In other examples discussed further below, the processing system 910 and the hardware accelerator 816 can be implemented on the same IC using a System-On-Chip (SoC).

The system memory 916 is a device allowing information, such as executable instructions and data, to be stored and retrieved. The system memory 916 can include, for example, one or more random access memory (RAM) modules, such as double-data rate (DDR) dynamic RAM (DRAM). The storage device 918 includes local storage devices (e.g., one or more hard disks, flash memory modules, solid state disks, and optical disks) and/or a storage interface that enables the computing system 808 to communicate with one or more network data storage systems. The hardware 904 can include various other conventional devices and peripherals of a computing system, such as graphics cards, universal serial bus (USB) interfaces, and the like.

The hardware accelerator 816 includes a programmable IC 928, a non-volatile memory 924, and RAM 926. The programmable IC 928 can be an FPGA or the like or an SoC having an FPGA or the like. The NVM 924 can include any type of non-volatile memory, such as flash memory or the like. The RAM 926 can include DDR DRAM or the like. The programmable IC 928 is coupled to the NVM 924 and the RAM 926. The programmable IC 928 is also coupled to the peripheral bus 915 of the processing system 910.

The OS 914 can be any commodity operating system known in the art, such as such as Linux®, Microsoft Windows®, Mac OS®, or the like. The acceleration libraries 814 includes drivers and libraries that provide APIs for command and control of the hardware accelerator 816. The applications 812 include software executing on the microprocessor 912 that invokes the APIs of the acceleration libraries 814 to implement neural network(s).

In operation, the programmable IC 928 is configured with an acceleration circuit 930. In one example, the acceleration circuit 930 is the neural network accelerator 165 in FIG. 2 but the embodiments herein are not limited to such and may be other types of neural network accelerators or other types of hardware accelerators. The acceleration circuit 930 generally includes a base platform 930A and a kernel 930B. For example, the acceleration circuit 930 can be implemented using a static region 934 and a programmable region 936. The static region 934 includes support circuits 940 for providing an interface to the peripheral bus 915, the NVM 924, and the RAM 926. The programmable region 936 can include one or more kernel circuits ("kernel(s) 938"). The base platform 930A is implemented using the static region 934, and the kernel 930B is implemented using the programmable region 936. In another example, the base platform 930A can also be implemented using a portion of the programmable region 936. Thus, in some examples, the programmable region 936 also includes some interface circuits. In some examples, the acceleration circuit 930 can include more than one programmable region 936, each of which can be individually configured with kernel(s) 938.

The static region 934 is "static" in that the circuitry thereof remains constant across reconfigurations of the programmable region 936. In an example, the support circuits 940 include PCIe endpoint circuits, a direct memory access (DMA) controller, interconnects, a memory controller, a memory interface circuit (e.g., a DDR interface), decoupler circuits (to support partial reconfiguration), flash programmer, debug circuits, and the like. In some examples, the programmable region 936 does not include any of the support circuits 940. In other examples, some support circuits are implemented in the programmable region 936. In such case, the programmable region 936 can be referred to as an "expanded programmable region." In either case, in one example, some support circuits 940 are always present in the static region 934, such as the PCIe circuits and the DMA circuits.

Figure 10:
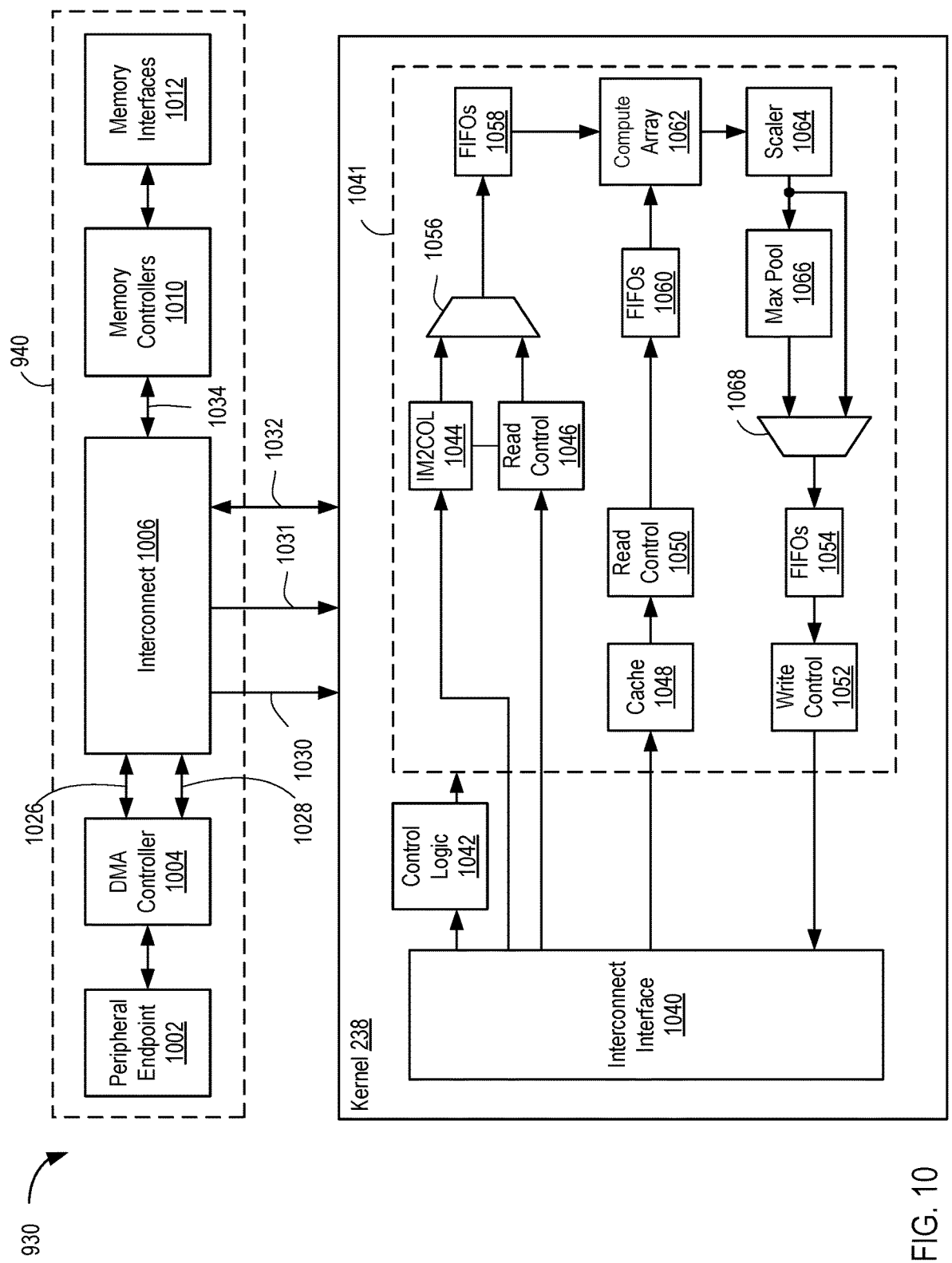
FIG. 10 is a block diagram depicting an acceleration circuit according to an example.

FIG. 10 is a block diagram depicting an acceleration circuit 930 according to an example. The acceleration circuit 930 includes the support circuits 940 and a kernel 938. In the example, the support circuits 940 include a PCIe endpoint circuit ("PCIe endpoint 1002"), a PCIe DMA controller 1004, interconnect circuits ("interconnect 1006"), memory controllers 1010, and memory interfaces 1012. The support circuits 940 can include other circuits, which are omitted for clarity (e.g., decoupler circuits, debug circuits, etc.). The PCIe endpoint 1002 provides a physical interface to the peripheral bus 915. The PCIe DMA controller 1004 facilitates DMA operations to the RAM 926 and the kernel 938. The interconnect 1006 couples the PCIe DMA controller 1004 to the memory controllers 1010 and to the kernel 938. The memory controllers 1010 are coupled to the memory interfaces 1012. The memory interfaces 1012 are coupled to the RAM 926.

In operation, the acceleration libraries 946 can access the RAM 926 directly through the PCIe DMA controller 1004. The acceleration libraries 946 can also access the kernel 938 through the PCIe DMA controller 1004. The kernel 938 can access the RAM 926 through the memory controllers 1010. Data can be exchanged between the software 906 and the kernel 938 using DMA operations between the system memory 916 and the RAM 926.

In the example, the kernel 938 uses interfaces 1030, 1031, and 1032 to communicate with the interconnect 1006. In particular, these interfaces may include a first read interface 1030, a second read interface 1031, and a read/write interface 1032. For example, the read interface 1030 can be used as a control interface for controlling the kernel 938. The read interface 1031 can be used to read from the RAM 926 through a first one of the memory interfaces 1012. The read/write interface 1032 can be used to read and write from the RAM 926 through a second one of the memory interfaces 1012.

The kernel 938 includes an interconnect interface 1004, control logic 1042, and processing circuits 1041. The processing circuits 1041 include an IM2COL circuit ("IM2COL 1044"), a read control circuit ("read control 1046"), a multiplexer 1056, first-in-first-out circuits ("FIFOs 1058"), DSP array 1062, a scaler circuit ("scaler 1064"), a max pool circuit ("max pool 1066"), a multiplexer 1068, FIFOs 1054, write control circuit ("write control 1052"), a cache 1048, a read control circuit ("read control 1050"), and FIFOs 1060. The interconnect interface 1040 is coupled to the interfaces 1030, 1031, and 1032, the control logic 1042, and the processing circuits 1041. The interconnect interface 1040 can include switches, clock converters, and the like to facilitate communication between the control logic 1042 and the interface 1030, as well as between the processing circuits 1041 and the interfaces 1031 and 1032.

In the example, the interconnect interface 1040 is coupled to inputs of the IM2COL circuit 1044, the read control circuit 1046, the cache 1048, and the write control circuit 1052. Outputs of the IM2COL circuit 1044 and the read control circuit 1046 are coupled to inputs of the multiplexer 1056. An output of the multiplexer 1056 is coupled to an input of the FIFOs 1056. An output of the FIFOs 1056 is coupled to a first input of the compute array 1062. An output of the cache 1048 is coupled to an input of the read control circuit 1050. An output of the read control circuit 1050 is coupled to an input of the FIFOs 1060. An output of the FIFOs 1060 is coupled to a second input of the compute array 1062. An output of the compute array 1062 is coupled to an input of the scaler 1064. An output of the scaler 1064 is coupled to an input of the max pool circuit 1066 and an input of the multiplexer 1068. An output of the max pool circuit 1066 is coupled to another input of the multiplexer 1068. An output of the multiplexer 1068 is coupled to an input of the FIFOs 1054. An output of the FIFOs 1054 is coupled to the write control circuit 1052.

In operation, the compute array 1062 performs matrix multiplication operations for implementing a neural network. The inputs of the compute array 1062 receive input activation matrices from the FIFOs 1058 and weight matrices from the FIFOs 1060. The input activation matrices can be read directly from the RAM 926 using the read control circuit 1046. Alternatively, the input activations can be read from the RAM 926 and processed by the IM2COL circuit 1044 for input to the compute array 1062. Embodiments of the IM2COL circuit 1044 are described below. Weight matrices can be read from the RAM 926 by the read control circuit 1050 and cached in cache 1048. The scaler 1064 can scale the output of the compute array 1062. The max pool circuit 1066 can implement a max pooling function on the scaled output of the compute array 1062. In one example, the max pool circuit 966 is implemented using configurable logic blocks (CLBs) or other configurable logic. Either the output of the max pool circuit 1066 or the scaler 1064 can be stored in the FIFOs 1054. The write control circuit 1052 writes data in the FIFOs to the RAM 926. The control logic 1042 controls the various circuits in the processing circuits 1041, such as the IM2COL circuit 1044, the read control circuit 1046, the multiplexers 1056 and 1068, the read control circuit 1050, and the scaler 1064, the max pool circuit 1066, and the write control circuit 1052.

Figure 11:
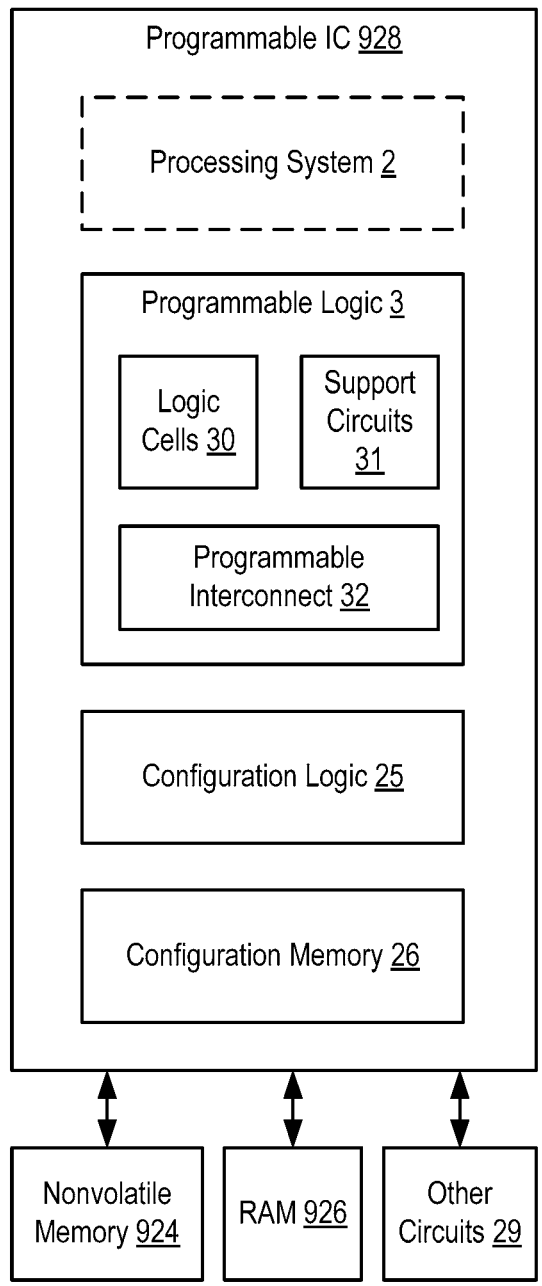
FIG. 11 is a block diagram depicting a programmable integrated circuit (IC) according to an example.

FIG. 11 is a block diagram depicting a programmable IC 928 according to an example. The programmable IC 228 includes programmable logic 3, configuration logic 25, and configuration memory 26. The programmable IC 928 can be coupled to external circuits, such as the NVM 924, the RAM 926, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 924 or any other source (e.g., the DRAM 28 or from the other circuits 29). In some examples, the programmable IC 928 includes a processing system 2. The processing system 2 can include microprocessor(s), memory, support circuits, IO circuits, and the like. For example, the processing system 2 can include circuits similar to the processing system 910. In some examples, the processing system 2 can be used in place of the processing system 910. In such case, the entire computing system 808 can be implemented using the programmable IC 928, where the software 906 executes on the processing system 2.

Figure 12:
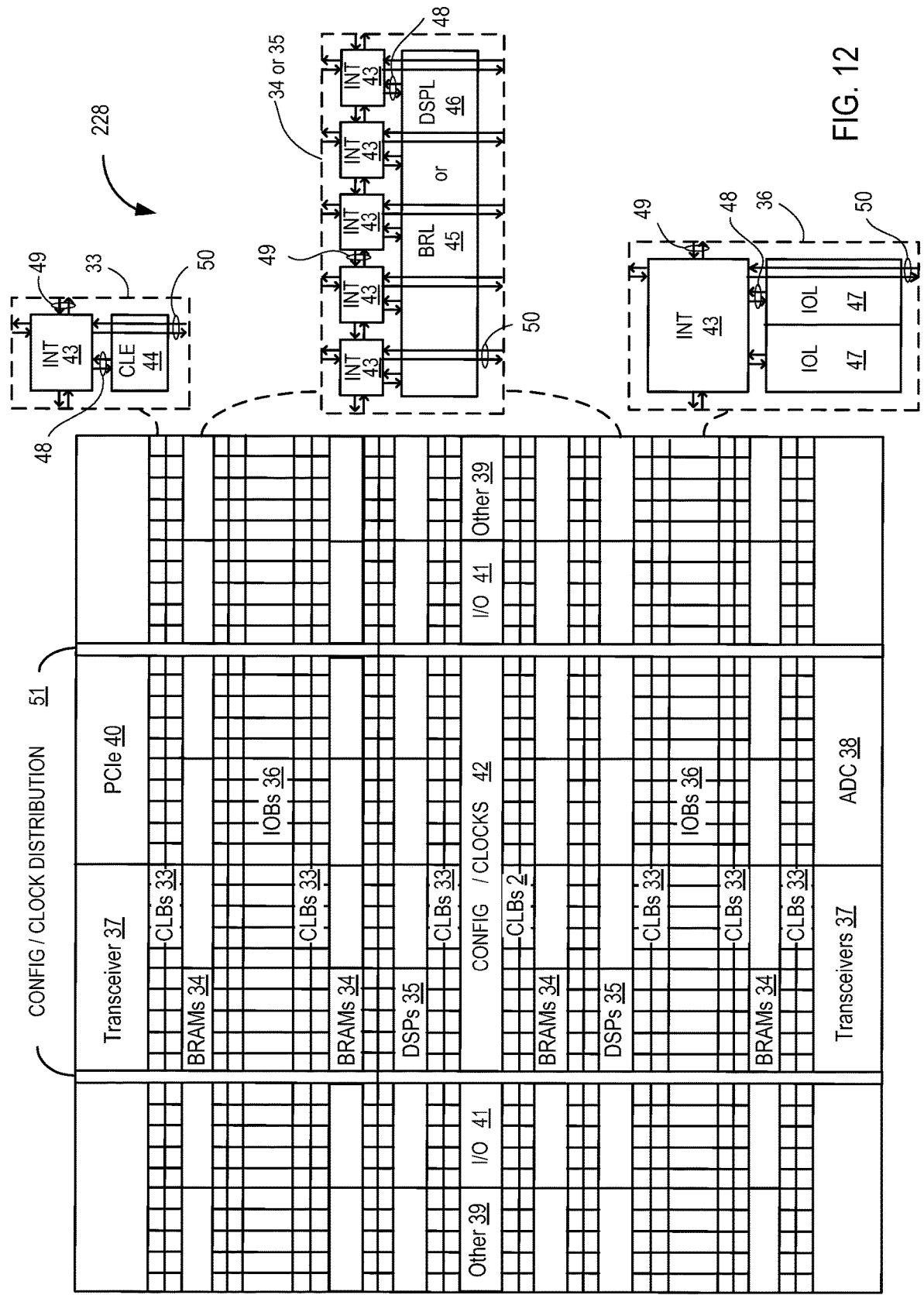
FIG. 12 illustrates a field programmable gate array (FPGA) implementation of a programmable IC according to an example.

FIG. 12 illustrates an FPGA implementation of the programmable IC 928 that includes a large number of different programmable tiles including transceivers 37, CLBs 33, BRAMs 34, input/output blocks ("IOBs") 36, configuration and clocking logic ("CONFIG/CLOCKS") 42, DSPs 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 12. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 12) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 12 include additional logic blocks that disrupt the regular columnar structure making up a large part of the FPGA. The additional logic blocks can be programmable blocks and/or dedicated logic.

Note that FIG. 12 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 12 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects described herein may take the form of an entirely hardware embodiment, an entirely software embodiment (including firmware, resident software, micro-code, etc.) or an embodiment combining software and hardware aspects that may all generally be referred to herein as a "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method for pipelining tasks submitted to a neural network accelerator, the method comprising:
    establishing a pipeline comprising multiple stages in a library, wherein the pipeline and the library execute on a host;
    receiving, at the library executing on the host, a first task from a neural network application to be processed by the neural network accelerator;
    generating, using one or more computer processors, a packet that contains information used by the multiple stages in the pipeline operating in the library, wherein the library is an adapter between the neural network application executing on the host and the neural network accelerator executing on a hardware system;
    processing the packet at the multiple stages, wherein at least one of the multiple stages performs a call to the neural network accelerator executing on the hardware system, and wherein the pipeline processes at least one other packet corresponding to a second task in parallel with processing the packet; and
    returning results of processing the packet using the pipeline to the neural network application.

2. The method of claim 1, wherein processing the packet at the multiple stages comprises:
    processing the packet at a pre-processing stage;
    processing the packet at an execute stage occurring after the pre-processing stage, wherein the call to the hardware system occurs during the execute stage; and
    processing the packet at a post-processing stage after the execute stage.

3. The method of claim 2, wherein processing the packet at the pre-processing stage comprises:
    converting data corresponding to the first task from a first format used by the neural network application to a second format used by the hardware system,
    wherein processing the packet at the post-processing stage comprises converting the results from the second format to the first format.

4. The method of claim 1, wherein each of the multiple stages comprises a respective thread that processes the packet independently from the other threads.

5. The method of claim 1, further comprising:
    generating a memory map that maps allocated blocks of memory for the neural network application to allocated blocks of memory for the neural network accelerator executing on the hardware system; and
    converting first memory addresses received from the neural network application based on the memory map into second memory addresses for memory blocks in the hardware system.

6. The method of claim 1, further comprising:
    transferring weights used to perform multiple layers of a neural network to the hardware system in a matrix format;

identifying a subset of the weights corresponding to a new task; and transmitting an offset to the hardware system indicating the subset of the weights that are to be used when processing the packet.

7. The method of claim 1, further comprising:

obtaining a metric regarding execution of the neural network accelerator executing on the hardware system;

outputting for display a visual representation of the metric; and adjusting hardware resources executing the multiple stages in the pipeline to increase utilization of the neural network accelerator.

8. The method of claim 1, wherein the multiple stages in the pipeline are defined in a library, wherein the library comprises an application program interface (API) that is configured to permit different types of neural network applications to use the multiple stages in the pipeline to submit tasks to the neural network accelerator.

9. The method of claim 1, further comprising:

customizing a plurality of fields in the packet used to provide information to the neural network accelerator, wherein the customized plurality of fields varies according to a type of the neural network accelerator, wherein different types of neural network accelerators use different fields.

10. The method of claim 1, further comprising:

determining a debugging function is active; and switching between submitting the packet to the neural network accelerator to submitting the packet to the one or more computer processors on the host executing the neural network application.

11. A computing system, comprising:

a processor; and a memory comprising a library that is an adapter between a neural network application and a neural network accelerator executing on a hardware system, wherein the library, when executed by the processor performs an operation comprising:

receiving a first task from the neural network application to be processed by the neural network accelerator;

generating, using one or more computer processors, a packet that contains information used by multiple stages in a pipeline within the library;

processing the packet at the multiple stages, wherein at least one of the multiple stages performs a call to the neural network accelerator executing on the hardware system, and wherein the pipeline processes at least one other packet corresponding to a second task in parallel with processing the packet; and returning results of processing the packet using the pipeline to the neural network application.

12. The computing system of claim 11, wherein processing the packet at the multiple stages comprises:

processing the packet at a pre-processing stage;

processing the packet at an execute stage occurring after the pre-processing stage, wherein the call to the hardware system occurs during the execute stage; and processing the packet at a post-processing stage after the execute stage.

13. The computing system of claim 12, wherein processing the packet at the pre-processing stage comprises:

converting data corresponding to the first task from a first format used by the neural network application to a second format used by the hardware system, wherein processing the packet at the post-processing stage comprises:

converting the results from the second format to the first format.

14. The computing system of claim 11, wherein the operation further comprises:

generating a memory map that maps allocated blocks of memory for the neural network application to allocated blocks of memory for the neural network accelerator executing on the hardware system; and converting first memory addresses received from the neural network application based on the memory map into second memory addresses for memory blocks in the hardware system.

15. The computing system of claim 11, wherein the operation further comprises:

transferring weights used to perform multiple layers of a neural network to the hardware system in a matrix format;

identifying a subset of the weights corresponding to a new task; and transmitting an offset to the hardware system indicating the subset of the weights that are to be used when processing the packet.

16. The computing system of claim 11, wherein the operation further comprises:

obtaining a metric regarding execution of the neural network accelerator executing on the hardware system;

outputting for display a visual representation of the metric; and adjusting hardware resources executing the multiple stages in the pipeline to increase a utilization of the neural network accelerator.

17. The computing system of claim 11, wherein the multiple stages in the pipeline are defined in the library, wherein the library comprises an API that is configured to permit different types of neural network applications to use the multiple stages in the pipeline to submit tasks to the neural network accelerator.

18. The computing system of claim 11, wherein the operation further comprises:

customizing a plurality of fields in the packet used to provide information to the neural network accelerator, wherein the customized plurality of fields varies according to a type of the neural network accelerator, wherein different types of neural network accelerators use different fields.

19. The computing system of claim 11, further comprising:

determining a debugging function is active; and switching between submitting the packet to the neural network accelerator to submitting the packet to the processor in the computing system for execution.

20. A non-transitory computer-readable storage medium storing instructions, which when executed on one or more processing devices, perform an operation for pipelining tasks submitted to a neural network accelerator, the operation comprising:

receiving, at a library configured to execute on a host, a first task from a neural network application to be processed by the neural network accelerator;

generating, using one or more computer processors, a packet that contains information used by multiple stages in a pipeline operating in the library when executing on the host, wherein the library is an adapter between the neural network application executing on the host and the neural network accelerator executing on a hardware system;

processing the packet at the multiple stages, wherein at least one of the multiple stages performs a call to the hardware system executing on the neural network accelerator executing on the hardware system, and wherein the pipeline processes at least one other packet corresponding to a second task in parallel with processing the packet; and returning results of processing the packet using the pipeline to the neural network application.

\* \* \* \* \*